May 12, 1953     C. J. ARMSTRONG     2,637,968
SYNCHRONOUS MOTOR CARRYOVER CLOCK
Filed May 17, 1947     3 Sheets-Sheet 1
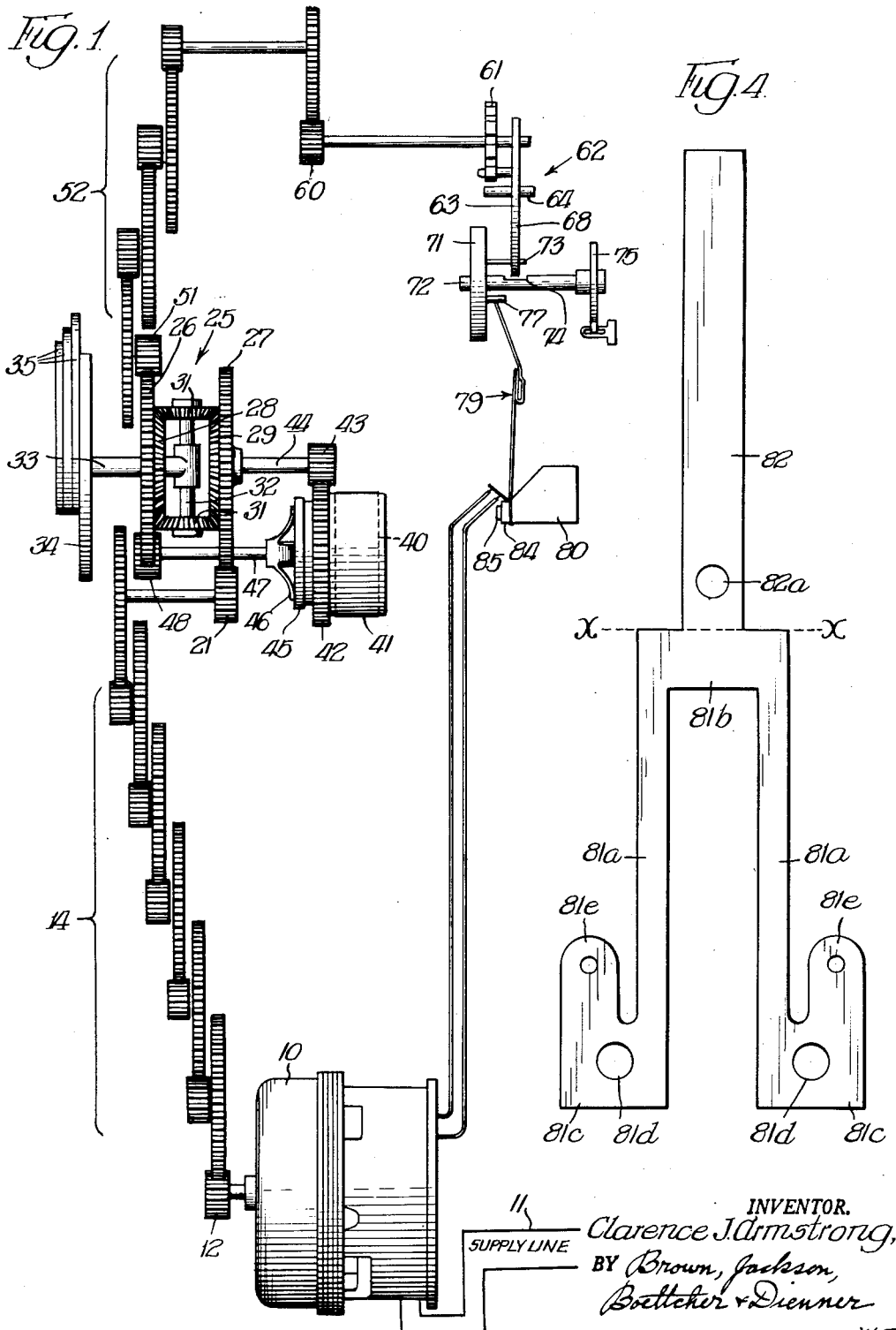
INVENTOR.
Clarence J. Armstrong,
BY Brown, Jackson,
Boettcher & Dienner
ATTYS.

May 12, 1953     C. J. ARMSTRONG     2,637,968
SYNCHRONOUS MOTOR CARRYOVER CLOCK
Filed May 17, 1947     3 Sheets-Sheet 2
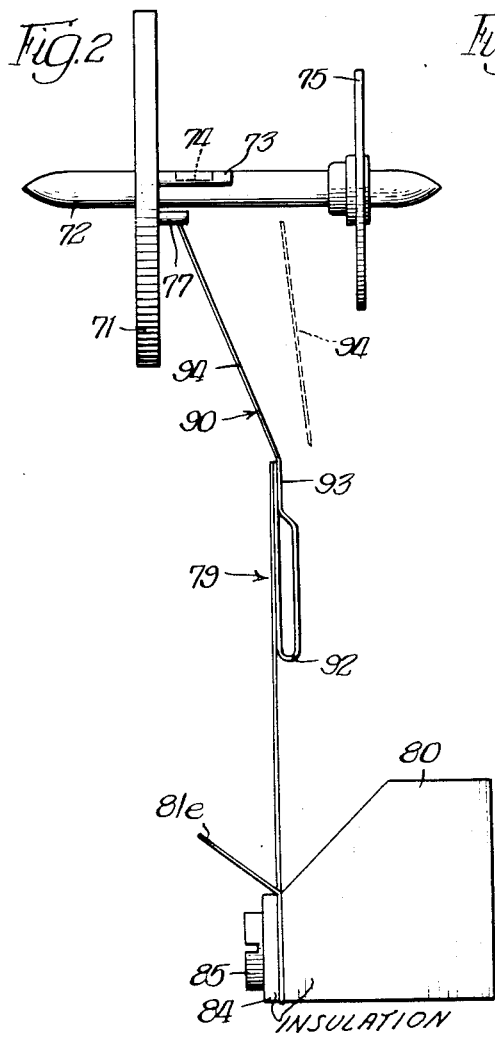
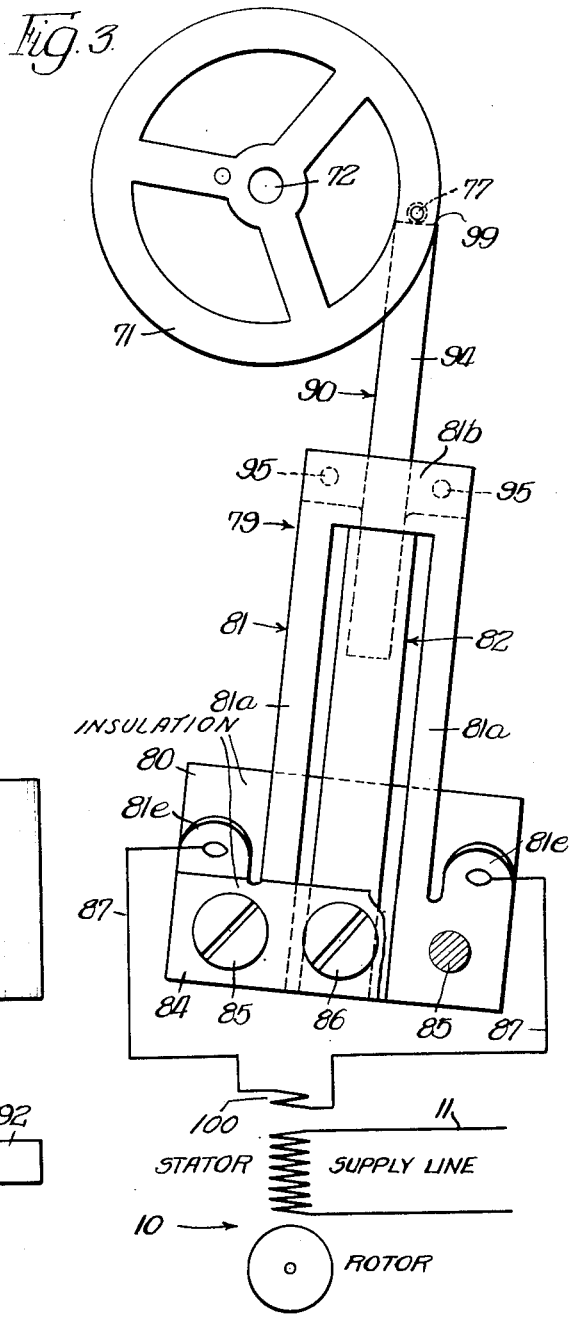
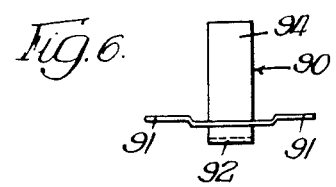
INVENTOR.
Clarence J. Armstrong,
BY Brown, Jackson,
Boettcher & Dienner
Attys.

May 12, 1953           C. J. ARMSTRONG           2,637,968
SYNCHRONOUS MOTOR CARRYOVER CLOCK
Filed May 17, 1947           3 Sheets-Sheet 3
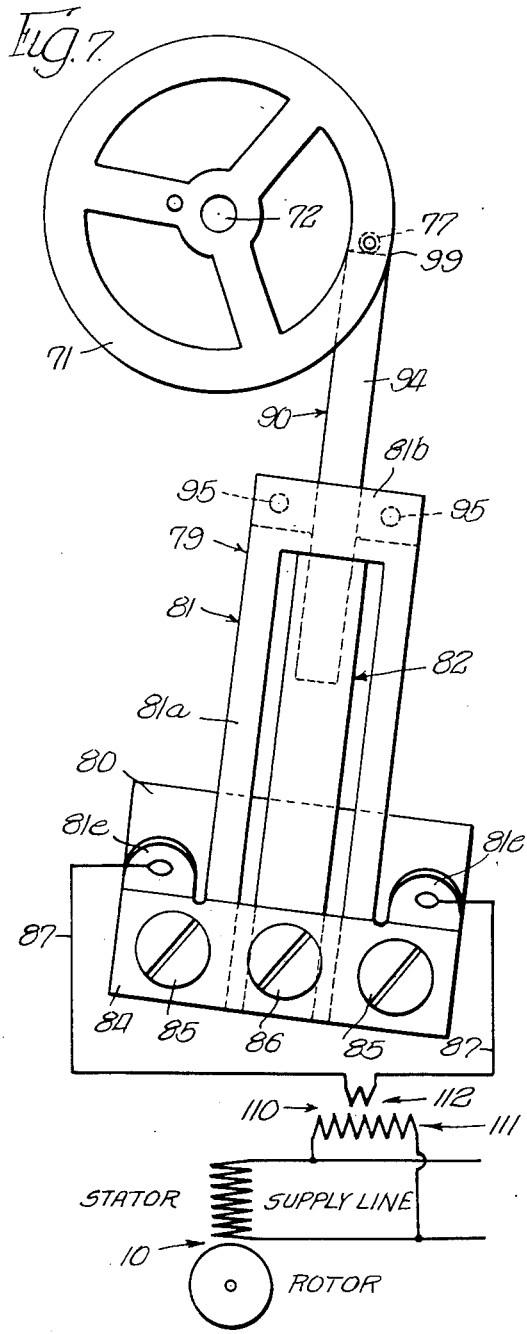
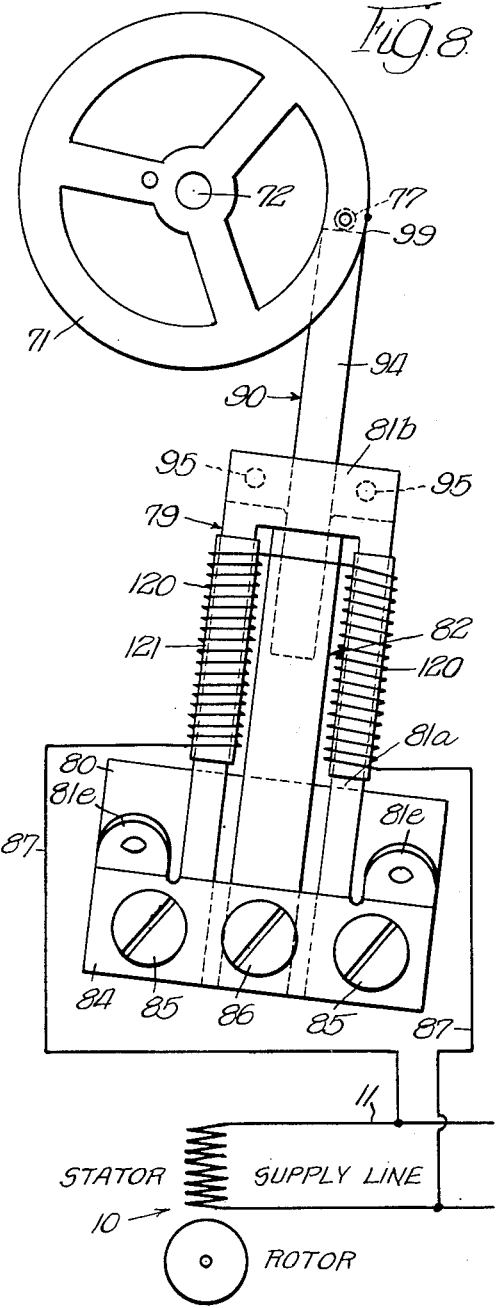
INVENTOR.
Clarence J. Armstrong,
BY Brown, Jackson, Boettcher
& Dienner
ATTYS Patented May 12, 1953

2,637,968

UNITED STATES PATENT OFFICE 2,637,968

SYNCHRONOUS MOTOR CARRYOVER CLOCK

Clarence J. Armstrong, Springfield, Ill., assignor to Sangamo Electric Company, Springfield, Ill., a corporation of Illinois Application May 17, 1947, Serial No. 748,807

14 Claims. (Cl. 58—26)

The present invention relates to timing apparatus, and more particularly to motor driven timing apparatus having a spring carry-over mechanism operative to continue the operation of the timing apparatus in the event of failure of the current supply to the electric motor. Typically representative of such timing apparatus are time switches, interval timers, electric clocks, and the like, normally driven by an alternating current synchronous motor, but provided with auxiliary spring carry-over mechanism adapted to continue the operation of the timing apparatus in the event that the synchronous motor stops operating because of failure of the current supply thereto. This spring carry-over mechanism usually comprises a clock spring or other energy storing spring which is adapted to be wound up either manually or by energy derived from the synchronous motor, and it also comprises some conventional form of escapement device which controls the rate of movement of the timing apparatus in the same manner as a conventional clock movement. Heretofore, one conventional practice has been to employ an electromagnetically responsive holding or blocking device to normally hold the spring carry-over mechanism against operation as long as current is being supplied to the synchronous motor. This prior form of holding or blocking device was arranged to respond electromagnetically to the presence of a current flow to the synchronous motor, and when the current flow was interrupted the device tripped or released the spring carry-over mechanism so as to continue the operation of the time responsive device during the abnormal current interruption on the supply line. Such electromagnetic type of holding or blocking device has been objectionable for several reasons. For example, the torque or energy available from such type of device is frequently inadequate to perform the various functions. Furthermore, the electromagnetic device has an objectionable hum or noise.

The principal object of the present invention is to provide an improved holding or blocking device which responds thermally to the presence of current on the current supply line, rather than electromagnetically. This thermal response eliminates all hum or noise. It also enables adequate torque to be obtained in a relatively simple, inexpensive structure.

Another object of the invention is to provide such a thermal blocking device which is compensated for changes in ambient temperature, so that the device will not be adversely affected by surrounding temperature changes resulting from weather or other conditions.

Another object of the invention is to simplify and reduce the cost of the blocking apparatus by arranging to have the thermal element heated by a low voltage current flow derived from a small additional winding on the synchronous motor.

Another object of the invention is to insure self-starting of the clock movement by having the blocking device hold the balance wheel of the clock movement in a biased position, so that immediately upon release the balance wheel can start oscillating automatically.

Other objects, features and advantages of the invention will appear from the following detail description of one preferred embodiment thereof. In the accompanying drawings illustrating such embodiment:

Figure 1 is a schematic diagram showing one typical arrangement of gearing for connecting the synchronous electric motor and the spring carry-over mechanism with the time driven member;

Figure 2 is a fragmentary side view showing the operating relation between the thermal blocking device and the balance wheel of the spring carry-over mechanism;

Figure 3 is a fragmentary front or plan view showing this operating relation between the thermal blocking device and the balance wheel;

Figure 4 is an elevational view of the original stamping from which the two thermostatic elements are produced;

Figure 5 is an elevational view of the resilient blocking finger which projects from the thermostatic assembly;

Figure 6 is an end view of this blocking finger;

Figure 7 is a view similar to Figure 3, showing a modified embodiment wherein the heating circuit is energized by a separate transformer; and Figure 8 is another view similar to Figure 3 showing another modified embodiment in which the thermostatic element is heated indirectly by auxiliary heating elements separate from the thermostatic device.

Referring first to Figure 1, this figure diagrammatically illustrates the electric motor gear train and the escapement clock gear train of any conventional time switch, electric clock or the like having a spring carry-over mechanism. For the purpose of illustrating one typical embodiment, I have shown the gear trains of Figure 1 as controlling the driving of time switch parts, such as are disclosed in Wilmeth and Keys Patent No. 1,992,273, issued February 26, 1935.

The electric motor 10 is preferably a self-starting synchronous motor adapted to operate off an alternating current supply line 11 in which the frequency is regulated or maintained sufficiently constant to serve for time keeping purposes. The pinion 12 on the rotor shaft of motor 10 is operatively connected through a conventional speed reducing gear train 14 which leads to a pinion 21 arranged to drive one side of a differential gear set 25.

This differential gear set comprises two relatively large parallel spur gears 26 and 27 which are coaxially mounted. The pinion 21 which is driven by the electric motor 10 through the speed reducing gear train 14 meshes with the right hand spur gear 27. Secured to the opposing inner sides of these two spur gears 26 and 27 are bevel gears or laterally facing gears 28 and 29. Meshing with the latter gears are planetary pinions 31 which are journaled on spider arms 32 projecting outwardly from a central driven shaft 33. This shaft 33 constitutes the time responsive or time driven element of the device, it being the main driven shaft which is adapted to be driven at a substantially constant timed rate. In the case of a time switch such as is disclosed in the aforementioned Patent No. 1,992,273, this shaft 33 would carry a time dial 34 and adjustable switch actuating levers or arms 35. In the case of an electric clock, the outer end of the shaft 33 would probably carry one of the clock hands, and the other clock hand would be driven therefrom through conventional gearing. It will be evident from the description thus far that the electric motor 10 is operative to drive the time responsive shaft 33 through the spur gear 27, lateral gear 29 and planetary pinions 31, this driving operation requiring, however, that the left hand spur gear 26 be held stationary at such time, so that the planetary pinions 31 will be compelled to revolve in their orbital paths, in order to carry the shaft 33 therewith.

Referring now to the clock spring and to the manner in which it is wound by the synchronous motor 10, this clock spring, indicated in dotted lines at 40, is confined within a rotating spring barrel 41, to which the outer end of the spring is secured. Rotatably mounted on this spring barrel is a spur gear 42 which is driven by spur pinion 43 which is connected through shaft 44 with the right hand gear 27 of the differential gear set. As previously described, this right hand gear 27 revolves continuously at a timed rate so long as the synchronous motor 10 is running, and hence torque is transmited through pinion 43 to constantly rotate gear 42. The spring barrel 41 is operatively connected with a rotatable driving disk or plate 45. The arms of an adjustably mounted spring spider 46 bear against the outer surface of driving disk 45 and are operatively connected to the spring barrel 41 to cause the inner surface of the driving disk 45 and the outer surface of the spring barrel 41 to bear frictionally against the surfaces of gear 42 providing a frictional slippage relation between the gear 42 and the outer end of the clock spring. The inner end of the clock spring is operatively connected with shaft 47. The other end of the shaft 47 carries a pinion 48 which meshes with the left hand spur gear 26 of the differential gear set. It will be evident from the description thus far that when the device starts up operation the gear 42 will drive the spring barrel 41 until the continued rotation of the spring barrel 41 has wound the clock spring 40 up to a predetermined tension which exceeds the frictional slippage torque of the slippage clutch 45, 42, 41, whereupon the gear 42 will slip idly relatively to the spring barrel 41 and the disk 45, so as to maintain a continuous torque upon the outer end of clock spring 40, the inner end of which in turn exerts a continuous torque upon the differential gear 26 through the shaft 47 and pinion 48.

This differential gear 26 is held locked against rotation so long as the synchronous motor 10 is energized, such locking function being performed by the above described thermal blocking device operating to hold the escapement gear train against motion. This escapement gear train starts from pinion 51, which meshes with differential gear 26, and continues on through a speed increasing gear train 52 which transmits torque to the pinion 60 of escapement wheel 61. This escapement mechanism, designated 62 in its entirety, may be of any preferred or conventional type, the construction shown being merely illustrative. In this construction, the escape wheel 61 responds to the oscillatory motion of an anchor escapement 63 mounted on the verge or pivot shaft 64. The slotted yoke formation 68 at the oscillating end of the anchor cooperates in conventional manner with a balance wheel 71 mounted on a staff 72, the balance wheel having a pin 73 and the staff having an associated notch 74 which coact with the slotted yoke end 68 of the anchor. A conventional hair spring 75 is connected to the staff of the balance wheel for imparting the oscillatory throw thereto in opposite directions.

Also projecting from the rim portion of the balance wheel is a small blocking pin 77 which is adapted to be engaged by the thermal blocking device designated 79 in its entirety.

As best shown in Figures 2 and 3, this thermal blocking device is mounted upon a block of insulation 80 suitably secured to one of the frame plates of the time switch or clock. Said blocking device comprises two thermostatic elements 81 and 82 arranged to act in opposition to each other so that changes in ambient temperature do not disturb the position of the blocking device. Both thermostatic elements consist of stampings punched out of bimetallic sheet material. The thermostatic element 81 is substantially U-shaped in form, comprising the two spaced side legs 81a—81a joined by a cross bar portion 81b integral therewith. In the finished unit, the other thermostatic element 82 lies in the open space between the two side legs 81a—81a. As shown in Figure 4, the two elements are first punched out in the form of a single stamping in which the thermostatic element 82 is coextensive as an integral extension from the cross bar portion 81b. The end of each side leg 81a is formed with a mounting portion 81c which is apertured at 81d to receive mounting screws. Terminal lugs 81e project from the mounting portions 81c for establishing electrical connection with the energizing circuit. In the initial punching operation, an aperture 82a is also punched in the inner portion of the element 82. The two thermostatic elements are then separated by a shearing operation performed along the line x—x. In the assembly of the blocking device, the element 82 is turned over with respect to the element 81, so that the two elements act in opposition and hence compensate for changes in ambient temperature. It will be noted that the element 82 is of a width substantially equal to the widths of both side legs 81a—81a so that the responsiveness is substantially equal. In the mounting of these thermostatic elements upon the insulating mounting block 81, a clamping plate 84 composed of insulating material is placed over the mounting ends of the thermostatic elements, and clamping screws 85 and 86 are passed down through this insulating plate and through the thermostatic elements into tapped holes in the insulating block 80. The side screws 85 pass down through the apertures 81d, and the central screw 86 passes down through the aperture 82a of the other thermostatic element. The conductors 87 of the energizing circuit are soldered or otherwise connected to the terminal lugs 81e, from which it will be seen that the current flow passes through the two outer side legs 81a—81a of element 81, but does not pass through the intermediate leg 82.

Projecting from the outer end of this E-shaped assembly of thermostatic elements 81 and 82 is a spring finger 90 punched out of a very thin bronze sheet. The initial stamping is in the form of a long narrow strip having a T-shaped end 91. These T-shaped cross arms are adapted to effect anchorage to the bi-metallic assembly on the under side thereof, and the stamping is shaped to form the rearwardly extending loop 92 projecting back along the under side of the thermostatic element 82. In the formation of this resilient loop the metal is folded back upon itself through a rounded curve and is then formed with an abutment portion 93 adapted for yielding abutment against the back side of the T-shaped or cross bar portion 91. The strip then extends from this abutment portion to form the diagonally projecting finger 94. It is the extremity of this finger 94 that normally lies in the path of the stop pin 77 on the balance wheel 71. In the attachment of this spring finger to the bi-metallic assembly the cross bar portion 91 is assembled over the tip end of the thermostatic element 82, and the ends of the portions 91 are welded to the cross bar portion 81b, as indicated at 95, whereby the portion 91 mechanically secures the end of thermostatic element 82 against the back side of cross bar portion 81b. The above described construction of the spring finger 90 assures a relatively positive motion of the finger when the cooling of the thermostatic element 81 is causing the spring finger to move backwardly into its unblocking position, and to assure a freely yielding or resilient motion of the spring finger when the heating of the thermostatic element 81 causes the finger to move forwardly back into its blocking position. The freely yieldable motion into the blocking position assures the necessary freedom of the oscillating blocking pin 77 when the latter is moving upwardly, and positive blocking of this pin on the succeeding return stroke or downward movement. This results in positioning pin 77 on the tip 99 of blade 94 during any period of electric power interruption, thereby biasing the balance and hair spring in position for starting when released.

In Figures 1 and 3, I have diagrammatically illustrated the conductors 87 as leading to a small secondary winding 100 suitably mounted on the stator of the synchronous motor 10. This secondary winding 100 supplies a very low voltage alternating current to the thermostatic element 81 for heating the side legs 81a thereof as long as the supply line leading to the motor is energized. In lieu of employing this secondary winding built into the motor structure, I may employ a small transformer connected directly to the supply line 11, as I shall later describe in connection with Fig. 7. However, the feature of employing the secondary winding 100 associated with or built into the motor structure is preferred over the use of a separate transformer because it provides a cheaper construction and also because it makes the energization of the thermostatic element dependent upon the energization of the synchronous motor, rather than upon the energization of a separate transformer which might remain energized under some abnormal condition in which a break in the motor circuit caused the motor alone to become de-energized.

In the operation of the apparatus, the thermostatic element 81 will have its two side legs 81a—81a heated by the current flow from secondary winding 100 so long as the supply line 11 and stator winding of the motor are energized. When the thermostatic element 81 is thus heated, the blocking device occupies the position shown in full lines in Figure 2, with the spring finger 90 abutting the adjacent side of the stop pin 77 on the balance wheel 71. Immediately upon any failure of current supply over circuit 11, or any interruption of the energization of the stator winding in the motor 10, the secondary winding 100 ceases to supply current to the thermostatic element 81 and the latter promptly cools. This causes the thermal blocking unit to flex away from the balance wheel substantially into the dotted line position shown in Figure 2, thereby freeing the stop pin 77 on the balance wheel. Immediately, the escapement train starts operating so as to pick up or carry over the function of causing the time driven shaft 33 to continue rotation at a timed rate. The escapement train will continue to rotate the shaft 33 at this timed rate, so long as the current interruption continues and so long as stored energy remains in the clock spring 40. Immediately upon resumption of current in the supply line 11, the heating of the thermostatic element 81 is resumed, with the result that the thermal blocking device flexes back into its full line position for stopping operation of the escapement train. With the restoration of current supply, the synchronous motor 10, of course, resumes operation for driving the time driven shaft 33 through the motor gear train. The cooling and heating of the thermostatic element 81 for shifting between the blocking and unblocking positions occurs in a very short space of time, such as three or four seconds, and hence there is a relatively negligible loss of time in the transition from synchronous motor drive to clock drive and back again. The parts are so arranged that when the thermal blocking device is holding the balance wheel 71 against motion this balance wheel is occupying an over-center or biased position in which the hair spring 75 tends to complete an oscillatory throw or give impetus to the balance wheel, so that the latter can start instantly when the blocking device releases the pin 77.

If desired, the thermostatic legs 81a—81a of element 81 could be heated by heating elements surrounding or adjacent thereto and energized either from line voltage or from a reduced voltage, as I shall presently describe in connection with Fig. 8. However, the internally heated construction disclosed is deemed preferable to the use of auxiliary heaters because of the additional cost of these heaters, the inefficient transfer of heat, delayed heating time, and likelihood of heating the other thermostatic element 82.

In Figure 7 I have illustrated the aforementioned modified embodiment wherein the heating circuit for supplying the very low voltage alternating current to the side legs 81a of the thermostatic element 81 is supplied from a separate transformer instead of from a secondary winding 100 built into the motor structure. This separate transformer is designated 110, and comprises a primary winding 111 and a secondary winding 112. The primary winding 111 is connected across the supply line 11 independently of the motor 10, and the secondary winding 112 is connected through the heating circuit 87, 87 to supply a low voltage alternating current to the side legs 81a of the thermostatic element 81 in the same manner described above in connection with Figure 3. This embodiment operates in the same manner as Figure 3, but by using the separate transformer 110, permits use of a standard alternating current synchronous motor 10 instead of requiring a special motor provided with a secondary winding.

In Figure 8 I have illustrated the above-mentioned modified embodiment wherein the thermostatic element 81 is externally heated indirectly by auxiliary heating elements disposed in heat transmitting relation to the side legs 81a, instead of having the side legs internally heated by passing the current directly therethrough. In this modified embodiment, the side legs 81a are externally heated by auxiliary heating coils 120 which are disposed in immediate heat transmitting relation to the side legs 81a, preferably by being wound around these side legs. If desired, these resistance coils 120 may be spaced from the side legs 81a by a layer of insulating material of heat refractory type, such as asbestos or the like, as indicated at 121. These resistance heating coils 120 may be energized from the secondary winding of the motor 10, as shown in Figure 3, or from a separate transformer 110, as shown in Figure 7. However, because of the substantial resistance inherent in the heating coils, they might also be energized directly from line voltage, if desired. In Figure 8 I have illustrated such latter arrangement wherein the heating circuit 87 is connected directly across the supply line 11.

While I have illustrated and described what I regard to be the preferred embodiments of my invention, nevertheless it will be understood that such are merely exemplary and that numerous modifications and rearrangements may be made therein without departing from the essence of the invention.

I claim:

1. In timing apparatus, the combination of a time responsive member adapted to be driven at a timed rate, electrically energized means for driving said time responsive member, spring carry-over mechanism for driving said time responsive member in the event of failure of the current supply to said electrically energized means, means for transmitting winding torque from said electrically energized means to said spring carry-over mechanism and means thermally responsive to the presence of said current supply for controlling the operation of said spring carry-over mechanism.

2. In timing apparatus, the combination of a time responsive member adapted to be driven at a timed rate, an electric motor for normally driving said time responsive member, clock mechanism for driving said time responsive member in the event of failure of the current supply to said electric motor, and means thermally responsive to the presence of current in the supply line to said motor for controlling the operation of said clock mechanism.

3. In timing apparatus, the combination of a time responsive member adapted to be driven at a timed rate, a synchronous electric motor operatively connected for normally driving said time responsive member, said motor being energized from an alternating current supply circuit, a spring driven clock movement adapted to drive said time responsive member in the event of failure of the current supply in said supply circuit, means for transmitting winding torque from said electric motor to the spring of said spring driven clock movement and thermostatic means thermally responsive to the current in said supply circuit for controlling the operation of said clock movement.

4. In timing apparatus, the combination of a time responsive member adapted to be driven at a timed rate, a synchronous electric motor for normally driving said time responsive member, a spring driven clock mechanism for driving said time responsive member in the event of failure of current supply to said electric motor, means for transmitting torque from said motor to said clock movement for winding the spring thereof, and thermostatic holding means thermally responsive to said current supply for holding said clock mechanism against operation but releasing said clock mechanism upon failure of said current supply.

5. In timing apparatus, the combination of a time responsive member adapted to be driven at a timed rate, a synchronous electric motor adapted to be energized from an alternating current supply line for normally driving said time responsive member, spring carry-over mechanism for driving said time responsive member in the event of failure of the current supply on said supply circuit, said carry-over mechanism comprising a clock spring and an escapement movement, means for winding said clock spring from said electric motor, and thermostatic means thermally energized by current transmitted over said supply circuit for normally holding said escapement movement against operation, said thermostatic means operating to release said escapement movement upon failure of the current supply over said supply circuit.

6. In timing apparatus, the combination of a time responsive member adapted to be driven at a timed rate, a synchronous electric motor energized from an alternating current supply line for driving said time responsive member, spring carry-over mechanism for driving said time responsive member in the event of failure of the current supply over said supply line, and a thermal blocking device normally holding said spring carry-over mechanism against motion but operative to release the latter in the event of such current failure, said blocking device comprising thermally responsive means normally heated by current derived from said supply line, and means for compensating said thermally responsive means for changes in ambient temperature.

7. In timing apparatus, the combination of a time responsive member adapted to be driven at a timed rate, a synchronous electric motor energized from an alternating current supply line for normally driving said time responsive member, a spring driven clock movement for driving said time responsive member in the event of failure of the current supply over said supply line, and a thermal blocking device normally holding said clock movement against motion but operative to release the latter in the event of such current failure, said blocking device comprising two thermostatic elements arranged to act in opposition for compensating for changes in ambient temperature, and means for electrically heating one of said thermostatic elements by current derived from said supply line, said current being passed directly through said latter thermostatic element to heat the same by direct electrical conductivity.

8. In timing apparatus, the combination of a time responsive member adapted to be driven at a timed rate, a synchronous electric motor adapted to be energized from an alternating current supply line for normally driving said time responsive member, a spring driven clock for driving said time responsive member when the current supply on said supply line is interrupted, mechanism for winding the spring of said clock from said synchronous motor, a thermal blocking device for normally holding said clock against motion but operative to release said clock upon such failure of the current supply, said blocking device comprising a bi-metallic thermostatic element adapted to flex thermally into and out of blocking position, and means for heating said bi-metallic strip comprising a winding energized by the current flow over said supply line.

9. In timing apparatus, the combination of a time responsive member adapted to be driven at a timed rate, a synchronous electric motor adapted to be energized from an alternating current supply line for normally driving said time responsive member, a spring driven clock for driving said time responsive member when the current supply on said supply line is interrupted, mechanism for winding the spring of said clock from said synchronous motor, a thermal blocking device for normally holding said clock against motion but operative to release said clock upon such failure of the current supply, said blocking device comprising a thermally actuated element adapted to move into and out of blocking position, and means for heating said thermally actuated element comprising a winding energized by the magnetic flux in said synchronous electric motor.

10. In time apparatus, the combination of a time responsive member adapted to be driven at a timed rate, a synchronous electric motor adapted to be energized from an alternating current supply line for normally driving said time responsive member, a spring driven clock for driving said time responsive member when the current supply on said supply line is interrupted, mechanism for winding the spring of said clock from said synchronous motor, a thermal blocking device for normally holding said clock against motion but operative to release said clock upon such failure of the current supply, said blocking device comprising two bi-metallic thermostatic elements arranged to act in opposition to compensate for changes in ambient temperature, a secondary winding in said synchronous electric motor adapted to be energized during the energization of said electric motor, and a circuit for conducting current from said secondary winding directly through one of said thermostatic elements for heating the latter as long as the supply line is energized.

11. In timing apparatus, the combination of a time responsive member adapted to be driven at a timed rate, a synchronous electric motor adapted to be energized from an alternating current supply line for normally driving said time responsive member, a spring driven escapement clock for driving said time responsive member when the current supply on said supply line is interrupted, a differential gear set through which said electric motor and said escapement clock are operable to drive said time responsive member alternatively, mechanism for winding the spring of said escapement clock from said synchronous motor, said escapement clock comprising a balance wheel having a stop projection thereon, a thermal blocking device for normally engaging said stop projection to hold said balance wheel against motion but operative to release the latter upon failure of the current supply in said supply line, said blocking device comprising a U-shaped thermostatic element of bi-metallic material, a second thermostatic element of bi-metallic material disposed between the side arms of said U-shaped element and arranged in thermal opposition to said U-shaped element so as to compensate for changes in ambient temperature, a spring blocking finger resiliently mounted on said thermostatic elements and adapted to occupy a blocking position in engagement with said stop projection on the balance wheel with the latter held in a biased position, said spring finger comprising mounting means constructed and arranged whereby said finger in its return motion into blocking position is characterized by a greater degree of resiliency than in its releasing motion, so that said finger is not capable of stopping oscillatory motion of said stop in one direction but is able to stop oscillatory motion of said stop in the other direction when said balance wheel is in said biased position, a secondary winding mounted on the stator of said synchronous electric motor adapted to be energized by the stator flux of said motor, and a circuit connecting said secondary winding with the side legs of said U-shaped thermostatic element for passing current directly through said side legs for internally heating the latter so long as said supply circuit is energized.

12. In timing apparatus, the combination of a time responsive member adapted to be driven at a timed rate, a synchronous electric motor adapted to be energized from an alternating current supply line for normally driving said time responsive member, a spring driven escapement clock for driving said time responsive member when the current supply on said supply line is interrupted, mechanism for winding the spring of said escapement clock from said synchronous motor, said escapement clock comprising a balance wheel having a stop projection thereon, a thermal blocking device for normally engaging said stop projection to hold said balance wheel against motion but operative to release the latter upon failure of the current supply in said supply line, said blocking device comprising a U-shaped thermostatic element of bi-metallic material, a second thermostatic element of bi-metallic material disposed between the side arms of said U-shaped element and arranged in thermal opposition to said U-shaped element so as to compensate for changes in ambient temperature, a spring blocking finger resiliently mounted on said thermostatic elements and adapted to occupy a blocking position in engagement with said stop projection on the balance wheel with the latter held in a biased position, said spring finger comprising mounting means constructed and arranged whereby said finger in its return motion into blocking position is characterized by a greater degree of resiliency than in its releasing motion, so that said finger is not capable of stopping oscillatory motion of said stop in one direction but is able to stop oscillatory motion of said stop in the other direction when said balance wheel is in said biased position, and means for heating the side legs of said U-shaped thermostatic element by current derived from said supply line.

13. In timing apparatus wherein a time responsive member is adapted to be normally driven by a synchronous electric motor energized from a supply line, and wherein said time responsive member is adapted to be driven by a spring carry-over mechanism in the event of failure of current supply over said supply line, the combination therewith of means thermally responsive to the presence of said current supply for controlling the operation of said spring carry-over mechanism.

14. In timing apparatus wherein a time responsive member is adapted to be normally driven by a synchronous electric motor energized from a supply line, and wherein said time responsive member is adapted to be driven by a spring driven clock movement having an escapement movement in the event of failure of current supply over said supply line, the combination therewith of a thermal blocking device normally holding said escapement movement against operation, said blocking device comprising thermally responsive means normally heated by current derived from said supply line.

CLARENCE J. ARMSTRONG.

References Cited in the file of this patent

UNITED STATES PATENTS

| Number | Name | Date |
| --- | --- | --- |
| 393,132 | Wagner | Nov. 20, 1888 |
| 1,795,013 | Denman | Mar. 3, 1931 |
| 1,931,019 | Chamberlain, Jr. | Oct. 17, 1933 |
| 1,974,409 | Brower | Sept. 25, 1934 |
| 2,234,764 | Ireland | Mar. 11, 1941 |
| 2,384,581 | Weidemeier | Sept. 11, 1945 |

FOREIGN PATENTS

| Number | Country | Date |
| --- | --- | --- |
| 810,735 | France | Jan. 6, 1937 |